June 30, 1925.
G. F. FISHER
MANUFACTURE OF TIRE TREADS
Filed Feb. 3, 1922
1,544,305
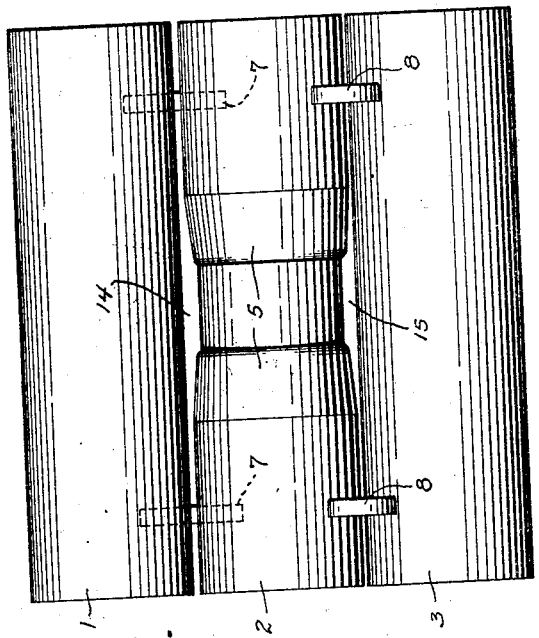
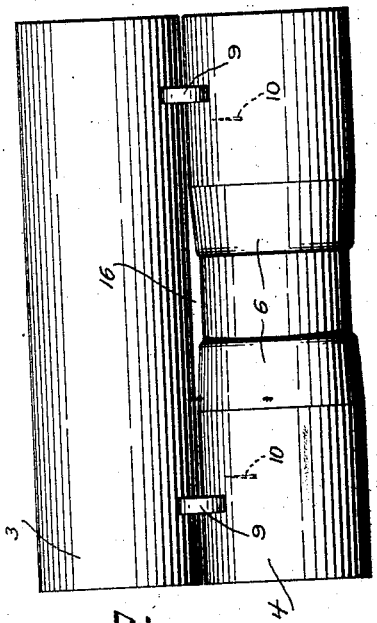
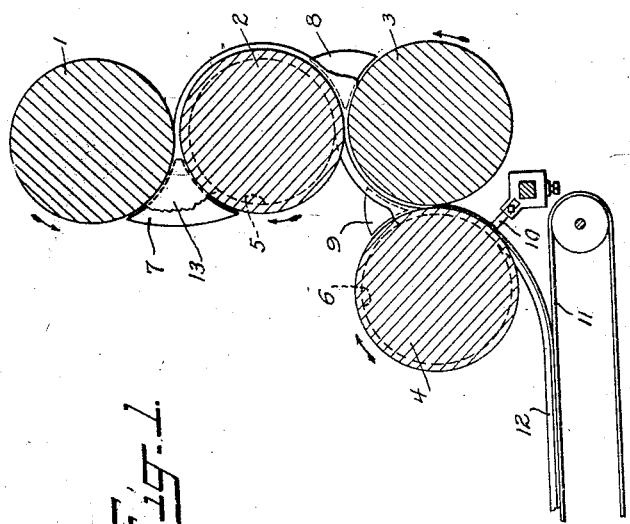
INVENTOR
GEORGE F. FISHER
BY Ernest Hopkinson
HIS ATTORNEY Patented June 30, 1925.

1,544,305

UNITED STATES PATENT OFFICE.

GEORGE F. FISHER, OF ROSELLE, NEW JERSEY, ASSIGNOR TO MORGAN & WRIGHT, A CORPORATION OF MICHIGAN.

MANUFACTURE OF TIRE TREADS.

Application filed February 3, 1922. Serial No. 533,764.

*To all whom it may concern:*

Be it known that I, GEORGE F. FISHER, a citizen of the United States, residing in Roselle, county of Union, State of New Jersey, have invented certain new and useful Improvements in the Manufacture of Tire Treads, of which the following is a full, clear, and exact description.

This invention relates to the manufacture of tires and in particular the production of tread stocks therefor.

In the manufacture of pneumatic casings, it is largely the practice to calender vulcanizable rubber composition for the treads, first, into a sheet of substantially uniform thickness, and then, into a strip of a cross-section more or less trapeziform. This is accomplished by passing the rubber between a pair of parallel cylindrical rolls which form it into a sheet that is carried around to the bight of a second pair of cooperating rolls, one of which is engraved to produce the cross-section desired in the tread stock. In this old practice, the calendered sheet of uniform thickness made in the first pass is wider and thinner than the finished tread stock and consequently, at the final pass, i. e., the bight between the engraved roll and its co-operating plain roll, the rubber composition is compelled to flow from its opposite sides towards the center. This direction of flow is substantially at right angles to the application of pressure by the calender rolls and frequently results in an imperfect product, fissures or scales being formed at the tread center and necessitating discard and re-calendering of the material. And especially, do these imperfections occur on the starting up of a calender, sometimes necessitating a lengthy run before the tread stocks are produced enough uniform in cross-section and density to pass requirements and then not being as near perfect as desired.

I have discovered that tread stocks may be produced more uniform in cross-section and density, and without substantial delay on starting up a calender, by forming them in successive stages. First, I bring the composition roughly to the cross-section desired and subsequently, compress or thin the strip and bring it to the final desired cross-section. That is to say, I gather the rubber in such mass, shape and thickness as to permit in the final shaping, a compressing and compacting of the rubber, insuring the elimination of scales, fissures, or cracks, the movement of the rubber in this final pass, if anything, being from the center towards the opposite sides of the strip contrariwise to the old practice.

An embodiment of the invention is illustrated in the accompanying drawings in which:—

Fig. 1 represents diagrammatically in side elevation a suitable and convenient arrangement of calender rolls, Fig. 2 is a rear elevation thereof, showing the first and intermediate passes, Fig. 3 is a plan view showing the final pass, Fig. 4 is a cross-section of a finished tread, superimposed dotted lines showing its cross-section at the first and intermediate stages.

In the drawings, I have illustrated diagrammatically a preferred form of calender for carrying on the invention. The rolls of the calender are indicated at 1, 2, 3 and 4, the first three being stacked vertically, and the last or fourth roll being arranged horizontally to one side of the roll 3, for convenience in changing over to make a tread stock of a slightly different size or shape. But the relative location or disposition of the rolls is widely variable. Rolls 2 and 4 are preferably engraved as shown at 5 and 6, respectively. Guides are employed as desired and needed to control the width of the plastic strip, these being shown conventionally at 7, 8 and 9. With the last roll 4 of the series to which the finally formed strip tends to cling co-operates a knife 10 which trims the margins or aprons of the stock and renders the strip uniform in width. The tread stock is usually delivered to a conveyor or endless belt 11 being carried away thereby to a cutting station for severance at the approximate length to encircle a plied up carcass.

According to my invention, the strip of tread stock 12, which is continuously formed from a bank 13 of vulcanizable rubber composition maintained between the bight of the rolls 1 and 2, is subjected to compression in the final pass between the bight of rolls 3 and 4, and preferably, but not necessarily, by a preceding compression in the intermediate pass between rolls 2 and 3. In other words, the gaps 14 and 15 between the rolls 1 and 2 and the rolls 2 and 3, respectively, are both preferably greater than the gap 16 between the rolls 3 and 4. And preferably, the gap 15 is less than the gap 14, i. e., the strip is preferably, but not necessarily, compressed and thinned in the intermediate pass 15 as well as in the final pass 16.

The engravings 5 and 6 on rolls 2 and 4 are preferably similar, if not identical, in which case the successive thinning of the tread stock may be obtained by suitably adjusting the rolls of the calender. But, the engravings 5 and 6 may be varied in depth to accomplish this same end. And while the engraving 5 is preferably similar or identical with the engraving 6, it is to be noted that this is not essential for the roll 2 may be engraved in any suitable manner to initially form the vulcanizable rubber composition into a strip whose area in cross-section is greater than finally desired, and also thicker, at least at its center.

In the drawings I have illustrated the preferred construction in which the engraving 5 is slightly deeper than the engraving 6 and also in which the rolls 1 and 2 are shown spaced farther apart than the rolls 2 and 3, these latter being also spaced farther apart than the rolls 3 and 4 in the final pass. In Fig. 4, the cross-section of the strip as it is delivered from the first pass is indicated at 6', its cross-section as it emerges from the second pass between the rolls 2 and 3 is indicated at 7'. And the cross-section of the strip as it is completed is indicated in solid lines at 8' in Fig. 4.

As presently comprehended, the essential principle of the invention is to make the rubber composition into a strip slightly thicker than desired, afterwards compressing and compacting the strip to reduce its thickness and compel the rubber, if anything, to flow in opposite directions from the center towards the sides of the strip. In this way, fissures, scales, or like imperfections, are positively eliminated from the product. Obviously, the advantages of the invention may be realized with other forms of engraving on the roll 2 than that shown, the ultimate limit being an engraving of rectangular cross-section for initially forming the rubber into a strip of greater thickness and area in cross-section than the finished strip of tread stock desired. I prefer, however, to closely approximate the shape of the outer face of the finished strip of tread stock in the first pass, and to initially make it thicker than finally required, at least at its center; to then compress and thin the strip somewhat; and to finally further compress and thin the strip. That is to say, I preferably so initially form the strip as to subsequently permit successive compressing and thinning thereof.

It will, therefore, be understood that the invention comprehends other forms of procedure and apparatus than that specifically disclosed, reference being made to the claims for an understanding of the scope of the invention.

Having thus described my invention, what I claim, and desire to protect by Letters Patent is:

1. That method of continuously forming vulcanizable rubber composition into tread stock which consists in, first forming the composition into a strip having a greater total area in cross-section and also a greater thickness at the center than the product sought, and subsequently compressing the strip, and shaping it to the desired form.

2. That method of continuously calendering rubber composition to form a strip of tread stock which consists in, forming the composition into a strip of approximately the desired cross-section, and subsequently compressing and thinning the strip to the exact cross-section desired.

3. That method of continuously calendering rubber composition to form a strip of tread stock which consists in, forming the composition into a strip of approximately the desired cross-section, and subsequently reducing the thickness of the cross-section of the strip.

4. A tread calender having, at least two pairs of cooperating rolls, one roll at least of each pair being engraved, and the engraved rolls defining passes of different thickness for permitting successive compression of a strip of rubber composition being calendered.

Signed at New York, county of New York, and State of New York, this 31st day of January, 1922.

GEORGE F. FISHER.